US011961532B2

(12) United States Patent
Rui et al.

(10) Patent No.: US 11,961,532 B2
(45) Date of Patent: Apr. 16, 2024

(54) BONE CONDUCTION HEADPHONE SPEECH ENHANCEMENT SYSTEMS AND METHODS

(71) Applicant: Google LLC, Mountain View, CA (US)

(72) Inventors: Steve Rui, Irvine, CA (US); Govind Kannan, Irvine, CA (US); Trausti Thormundsson, Irvine, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/106,251

(22) Filed: Feb. 6, 2023

(65) Prior Publication Data

US 2023/0186935 A1 Jun. 15, 2023

Related U.S. Application Data

(63) Continuation of application No. 17/123,091, filed on Dec. 15, 2020, now Pat. No. 11,574,645.

(51) Int. Cl.
*G10L 21/0216* (2013.01)
*G10L 21/0232* (2013.01)
(Continued)

(52) U.S. Cl.
CPC .......... *G10L 21/0216* (2013.01); *G10L 25/84* (2013.01); *H04R 1/1083* (2013.01); *G10L 2021/02166* (2013.01); *H04R 2460/13* (2013.01)

(58) Field of Classification Search
CPC ............. G10L 21/0216; G10L 21/0232; G10L 21/0208; G10L 21/02; G10L 25/84; G10L 25/78; G10L 2021/02166; G10L 2021/02165; G10K 11/17815; G10K 11/178; G10K 11/1752; G10K 11/175;
(Continued)

(56) References Cited

U.S. PATENT DOCUMENTS

| | | | | |
|---|---|---|---|---|
| 10,972,844 | B1 * | 4/2021 | Chiang | H04R 25/609 |
| 11,574,645 | B2 | 2/2023 | Rui et al. | |

(Continued)

FOREIGN PATENT DOCUMENTS

| | | |
|---|---|---|
| EP | 3328097 | 5/2018 |

OTHER PUBLICATIONS

Shin, “A Priori SNR Estimation Using Air- and Bone-Conduction Microphones”, IEEE/ACM Transactions on Audio, Speech, and Language Processing, vol. 23, No. 11, Nov. 2015.*

(Continued)

*Primary Examiner* — Leshui Zhang

(74) *Attorney, Agent, or Firm* — Kilpatrick Townsend & Stockton LLP

(57) ABSTRACT

Systems and methods for enhancing a headset user’s own voice include at least two outside microphones, an inside microphone, audio input components operable to receive and process the microphone signals, a voice activity detector operable to detect speech presence and absence in the received and/or processed signals, and a cross-over module configured to generate an enhanced voice signal. The audio processing components includes a low frequency branch comprising low pass filter banks, a low frequency spatial filter, a low frequency spectral filter and an equalizer, and a high frequency branch comprising highpass filter banks, a high frequency spatial filter, and a high frequency spectral filter.

20 Claims, 6 Drawing Sheets

(51) Int. Cl.

| | |
|---|---|
| ***G10L 25/84*** | (2013.01) |
| ***H04R 1/10*** | (2006.01) |
| ***H04R 1/40*** | (2006.01) |
| ***H04R 3/00*** | (2006.01) |

(58) Field of Classification Search

CPC ........ G10K 11/17854; G10K 11/17881; H04R 1/1083; H04R 1/10; H04R 1/406; H04R 1/40; H04R 2460/13; H04R 2460/01; H04R 2410/07; H04R 2430/03; H04R 3/005; H04R 3/00; H04R 25/00; H04R 25/407; H04R 25/453; H04R 25/552

USPC ............... 704/225, 226, 233, 237, 271, 272; 381/74, 26, 312–321, 72, 151, 92, 94.1, 381/94.2, 94.3, 119, 111–115, 71.1, 71.2, 381/71.6, 71.11, 71.12, 98, 99, 103

See application file for complete search history.

(56) References Cited

U.S. PATENT DOCUMENTS

| | | | | |
|---|---|---|---|---|
| 2015/0117649 | A1* | 4/2015 | Nesta | H04S 7/305 381/17 |
| 2016/0029120 | A1* | 1/2016 | Nesta | H04M 9/082 381/66 |
| 2017/0148428 | A1* | 5/2017 | Thuy | H04R 1/1083 |
| 2018/0268798 | A1 | 9/2018 | Mustiere et al. | |
| 2018/0367882 | A1* | 12/2018 | Watts | H04R 1/1083 |
| 2019/0172476 | A1 | 6/2019 | Wung et al. | |

OTHER PUBLICATIONS

International Search Report and Written Opinion for PCT/US2021/063255 dated Apr. 5, 2022, 17 pages.

Rahman et al., "Low-Frequency Band Noise Suppression Using Bone Conducted Speech", IEEE Pacific Rim Conference on Communications, Computers and Signal Processing, 2011, all pages.

* cited by examiner

BONE CONDUCTION HEADPHONE SPEECH ENHANCEMENT SYSTEMS AND METHODS

CROSS-REFERENCE TO RELATED APPLICATION

This application is a continuation of U.S. application Ser. No. 17/123,091, filed Dec. 15, 2020, which is hereby incorporated by reference in its entirety for all purposes.

TECHNICAL FIELD

The present disclosure relates generally to audio signal processing, and more particularly for example, to personal listening devices configured to enhance a user's own voice.

BACKGROUND

Personal listening devices (e.g., headphones, earbuds, etc.) commonly include one or more speakers allowing a user to listen to audio and one or more microphones for picking up the user's own voice. For example, a smartphone user wearing a Bluetooth headset may desire to participate in a phone conversation with a far-end user. In another application, a user may desire to use the headset to provide voice commands to a connected device. Today's headsets are generally reliable in noise-free environments. However, in noisy situations the performance of applications such as automatic speech recognizers can degrade significantly. In such cases the user may need to significantly raise their voice (with the undesirable effect of attracting attention to themselves), with no guarantee of optimal performance. Similarly, the listening experience of a far-end conversational partner is also undesirably impacted by the presence of background noise.

In view of the foregoing, there is a continued need for improved systems and methods for providing efficient and effective voice processing and noise cancellation in headsets.

SUMMARY

In accordance with the present disclosure, systems and methods for enhancing a user's own voice in a personal listening device, such as headphones or earphones, are disclosed. Systems and methods for enhancing a headset user's own voice include at least two outside microphones, an inside microphone, audio input components operable to receive and process the microphone signals, a voice activity detector operable to detect speech presence and absence in the received and/or processed signals, and a cross-over module configured to generate an enhanced voice signal. The audio processing components include a low frequency branch comprising low pass filter banks, a low frequency spatial filter, a low frequency spectral filter and an equalizer, and a high frequency branch comprising highpass filter banks, a high frequency spatial filter, and a high frequency spectral filter.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure sets forth various embodiments of improved systems and methods for enhancing a user's own voice in a personal listening device.

Many personal listening devices, such as headphones and earbuds, include one or more outside microphones configured to sense external audio signals (e.g., a microphone configured to capture a user's voice, a reference microphone configured to sense ambient noise for use in active noise cancellation, etc.) and an inside microphone (e.g., an ANC error microphone positioned within or adjacent to the user's ear canal). The inside microphone may be positioned such that it senses a bone-conducted speech signal when the user speaks. The sensed signal from the inside microphone may include low frequencies boosted from the occlusion effect and, in some cases, leakage noise from the outside of the headset.

In various embodiments, an improved a multi-channel speech enhancement system is disclosed for processing voice signals that include bone conduction. The system includes at least two external microphones configured to pick up sounds from the outside of the housing of the listening device and at least one internal microphone in (or adjacent to) the housing. The external microphones are positioned at different locations of the housing and capture the user's voice via air conduction. The positioning of the internal microphone allows the internal microphone to receive the user's own voice through bone conduction.

In some embodiments, the speech enhancement system comprises four processing stages. In a first stage, the speech enhancement system separates input signals into high frequency and low frequency processing branches. In a second stage, spatial filters are employed in each processing branch. In a third stage, the spatial filtering outputs are passed through a spectral filter stage for postfiltering. In a fourth stage, the low frequency spectral filtering output is compensated by an equalizer and mixed with the high frequency processing branch output via a crossover module.

Figure 1:
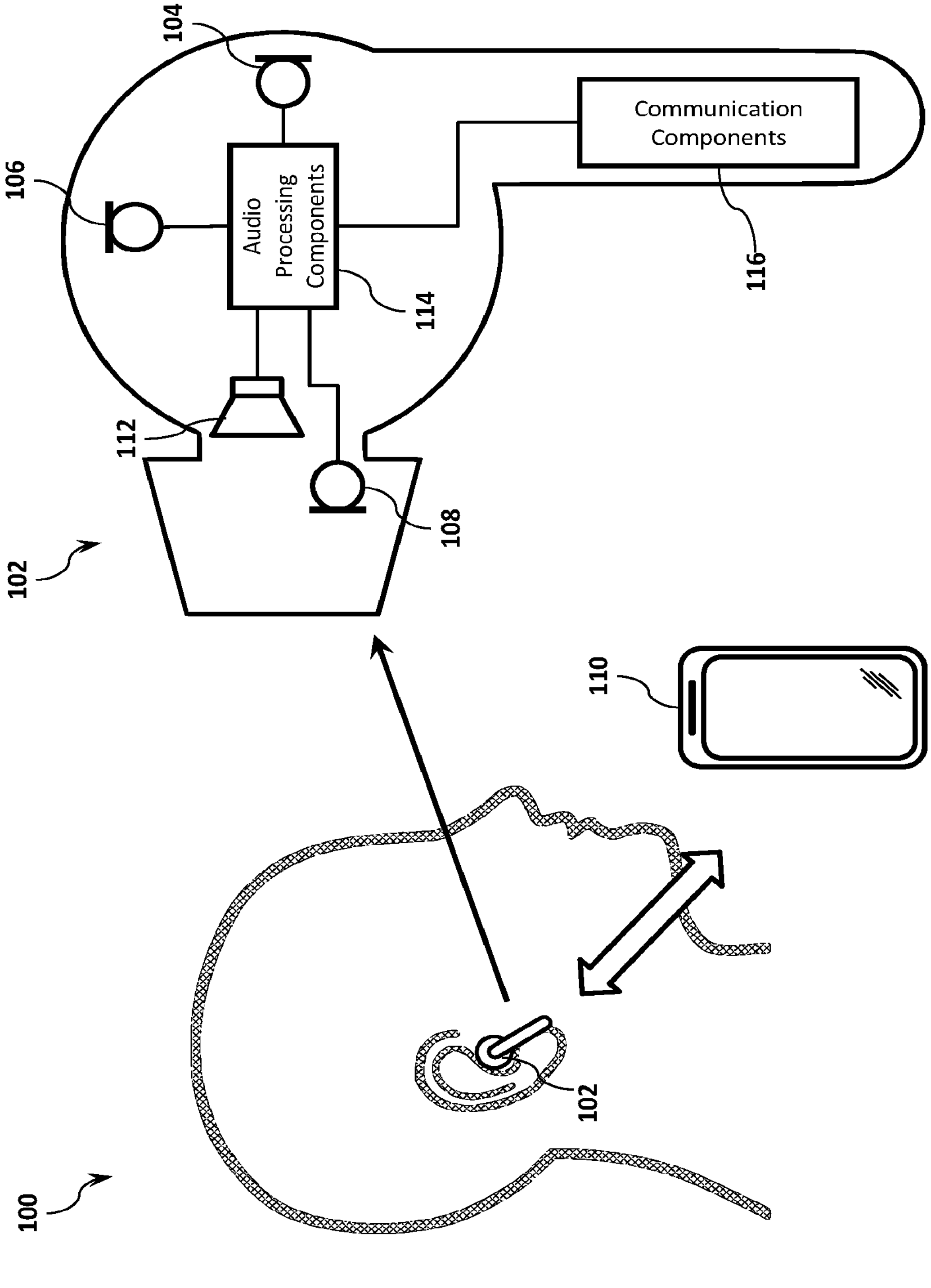
FIG. 1 illustrates an example personal listening device and use environment, in accordance with one or more embodiments of the present disclosure.

Referring to FIG. 1, an example operating environment will now be described, in accordance with one or more embodiments of the present disclosure. In various environments and applications, a user 100 wearing a headset, such as earbud headset 102 (or other personal listening device or "hearable" device), may desire to control a device 110 (e.g., a smart phone, a tablet, an automobile, etc.) via voice-control or otherwise deliver voice communications, such as through a voice conversation with a user of a far end device, in a noisy environment. In many noise-free environments, voice recognition using Automatic Speech Recognizers (ASRs) may be sufficiently accurate to allow for a reliable and convenient user experience, such as by voice commands received through an outside microphone, such as outside microphone 104 and/or outside microphone 106. In noisy situations, however, the performance of ASRs can degrade significantly. In such cases the user 100 may compensate by significantly raising his/her voice, with no guarantee of optimal performance. Similarly, the listening experience of far-end conversational partners is also largely impacted by the presence of background noise, which may, for example, interfere with a user's speech communications.

A common complaint about personal listening devices is poor voice clarity in a phone call when the user wears it in an environment with loud background noise and/or strong wind. The noise can significantly impede the user's voice intelligibility and degrade user experience. Typically, the external microphone 104 receives more noise than an internal microphone 108 due to attenuation effect of headphone housing. Also, wind noise happens at the external microphone because of local air turbulence at the microphone. The wind noise is usually non-stationary, and its power is mostly limited within low frequency band, e.g. <1500 Hz.

Unlike the air conduction external microphones, the position of the internal microphone 108 enables it to sense the user's voice via bone conduction. The bone conduction response is strong in a low frequency band (<1500 Hz) but weak in a high frequency band. If the headphone sealing is well designed, the internal microphone is isolated from the wind allowing it to receive much clearer user voice in the low frequency band. The systems and methods disclosed herein include enhancing speech quality by mixing bone conduction voice in the low frequency band and noise suppressed air conduction voice in the high frequency band.

In the illustrated embodiment, the earbud headset 102 is an active noise cancellation (ANC) earbud, that includes a plurality of external microphones (e.g., external microphones 104 and 106) for capturing the user's own voice and generating a reference signal corresponding to ambient noise for cancellation. The internal microphone (e.g., internal microphone 108) is installed in the housing of the earbud headset 102 and configured to provide an error signal for feedback ANC processing. Thus, the proposed system can use an existing internal microphone as a bone conduction microphone without adding extra microphones to the system.

In the present disclosure, robust and computationally efficient noise removal systems and methods are disclosed based on the utilization of microphones both on the outside of the headset, such as outside microphones 104 and 106, and inside the headset or ear canal, such as inside microphone 108. In various embodiments, the user 100 may discreetly send voice communications or voice commands to the device 110, even in very noisy situations. The systems and methods disclosed herein improve voice processing applications such as speech recognition and the quality of voice communications with far-end users. In various embodiments, the inside microphone 108 is an integral part of a noise cancellation system for a personal listening device that further includes a speaker 112 configured to output sound for the user 100 and/or generate an anti-noise signal to cancel ambient noise, audio processing components 114 including digital and analog circuitry and logic for processing audio for input and output, including active noise cancellation and voice enhancement, and communications components 116 for communicating (e.g., wired, wirelessly, etc.) with a host device, such as the device 110. In various embodiments, the audio processing components 114 may be disposed within the earbud/headset 102, the device 110 or in one or more other devices or components.

The systems and methods disclosed herein have numerous advantages compared to the existing solutions. First, the embodiments disclosed herein use two spatial filters for high frequency and low frequency processing, individually. The high frequency spatial filter suppresses high frequency noises in the external microphone signals. In some embodiments, it can use conventional air conduction microphone spatial filtering solutions, such as fixed beamformers (e.g., delay and sum, Superdirective beamformer, etc.), adaptive beamformers (e.g., Multi-channel Wiener filter (MWF), spatial maximum SNR filter (SMF), Minimum Variance Distortionless Response (MVDR), etc.), and blind source separation, for example.

The geometry/locations of the external microphones on the personal listening device can be optimized to achieve acceptable noise reduction performance, which may depend on the type of personal listening device and the expected use environments. The low frequency spatial filter suppresses low frequency noise by exploiting the speech and noise transfer functions between the external and internal microphones. Such information is usually not well determined by the external and internal microphone locations, alone. The headphone design and the user's physical features (head shape, bone, hair, skin, etc.) have heavy influence on the transfer function. The typical air conduction solutions will perform poorly most cases. Hence, the embodiments disclosed herein use individual spatial filters for speech enhancement in the high frequency and low frequency processing respectively.

Second, unlike most traditional speech enhancement systems that use only air conduction microphones, the proposed system achieves higher output SNR in a low frequency band by using the bone conduction microphone signal, whose input SNR is higher than the external microphone.

Third, the present disclosure applies post-filtering spectral filters to further improve the voice quality. This stage functions to reduce noise residues from the spatial filter stage. The existing solutions usually assume the bone conduction signal is noiseless. However, this is not always true. Depending on noise type, noise level, and headphone sealing, wind and background noise can still leak into the headphone housing. The spectral filter stage is configured to perform noise reduction not only on the high frequency band but also low frequency band and may use a multi-channel spectral filter.

Fourth, the solutions disclosed herein can be applied to both acoustic background noise and wind noise. Traditional solutions usually employ different techniques to handle different types of noise.

Figure 2:
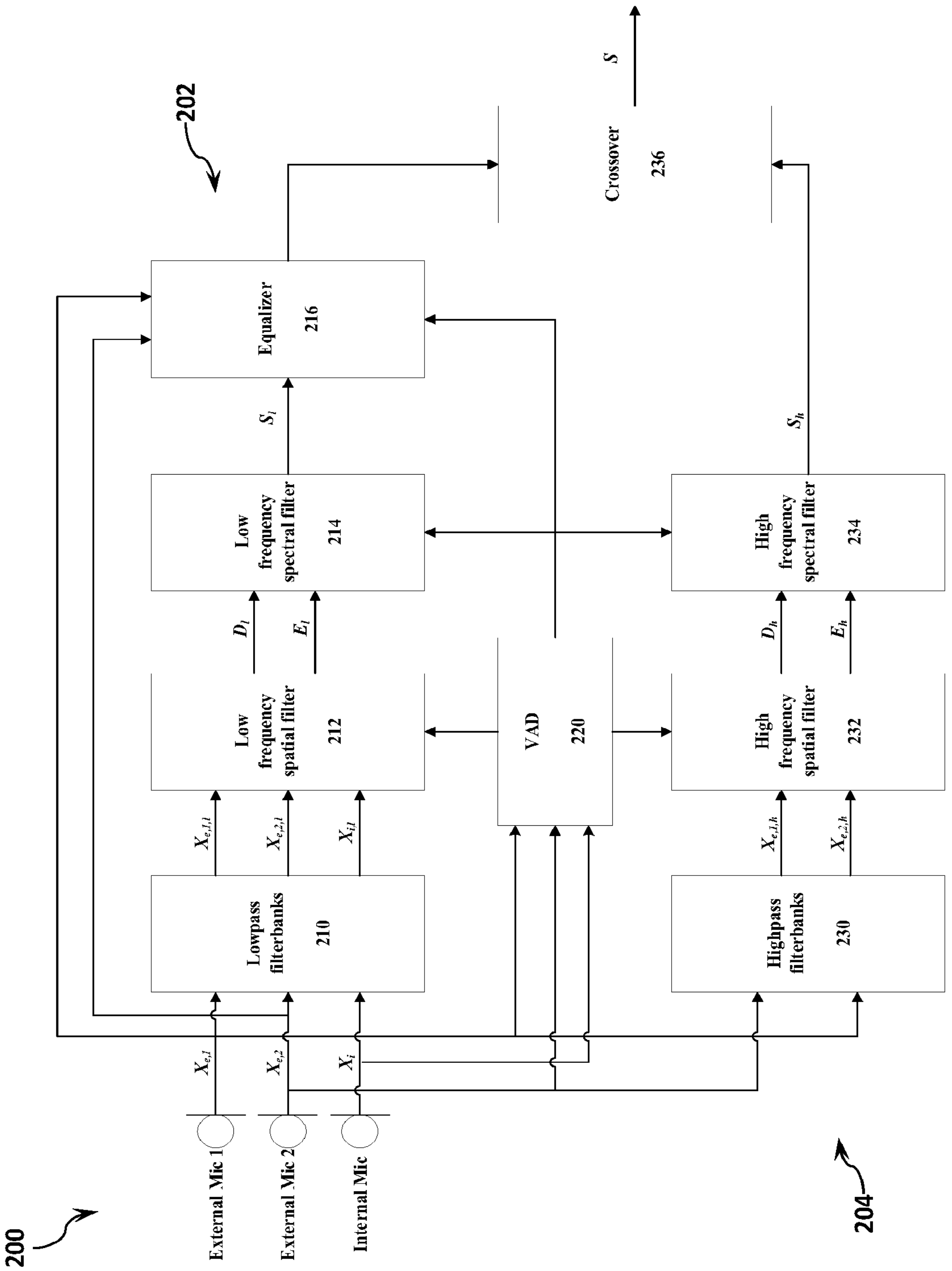
FIG. 2 is a diagram of an example speech enhancement system, in accordance with one or more embodiments of the present disclosure.

FIG. 2 illustrates an embodiment of a system 200 with two external microphones (external mic 1 and external mic 2) and one internal microphone (internal mic). Embodiments of the present disclosure can be implemented in a system with two or more external microphones and at least one internal microphone. For example, if there are two external microphones, one can be positioned on the left ear side and the other one can be positions on the right ear side. The external microphones can also be on the same side, for example, one at the front and the other at the back of the personal listening device.

The two external microphone signals (e.g., which includes sounds received via air conduction) are represented as $X_{e,1}(f, t)$ and $X_{e,2}(f, t)$. The internal microphone signal (e.g., which may include bone conduction sounds) is represented as $X_i(f, t)$, where f represents frequency and t represents time.

The signals $X_{e,1}(f, t)$, $X_{e,2}(f, t)$, and $X_i(f, t)$ pass through lowpass filter banks 210 and are processed to generate $X_{e,1,l}(f, t)$, $X_{e,2,l}(f, t)$, and $X_{i,l}(f, t)$. The two external microphone signals $X_{e,1}(f, t)$ and $X_{e,2}(f, t)$ also pass through highpass filter banks 230, which processes the received signals to generate $X_{e,1,h}(f, t)$ and $X_{e,2,h}(f, t)$. Note that because of the lowpass effect on the bone conduction voice signal, the internal microphone signal $X_i(f, t)$ does not have many voice signals in the high frequency band, and it is not used in the high frequency processing branch 204. The cutoff frequencies of the lowpass filter banks 210 and highpass filter banks 230 can be fixed and predetermined. In some embodiments, the optimal value depends on the acoustic design of the headphone. In some embodiments, 3000 Hz is used as the default value.

Secondly, the low frequency spatial filter 212 of the lowpass branch 202 processes the lowpassed signals $X_{e,1,l}(f, t)$, $X_{e,2,l}(f, t)$, and $X_{i,l}(f, t)$ and obtains the low frequency speech and error estimates $D_l(f, t)$ and $\varepsilon_l(f, t)$. The high frequency spatial filter 232 processes the highpassed signals $X_{e,1,h}$ (f, t) and $X_{e,2,h}(f, t)$ and obtains the high frequency speech and error estimates D h (f, t) and E h (f, t).

Figure 3:
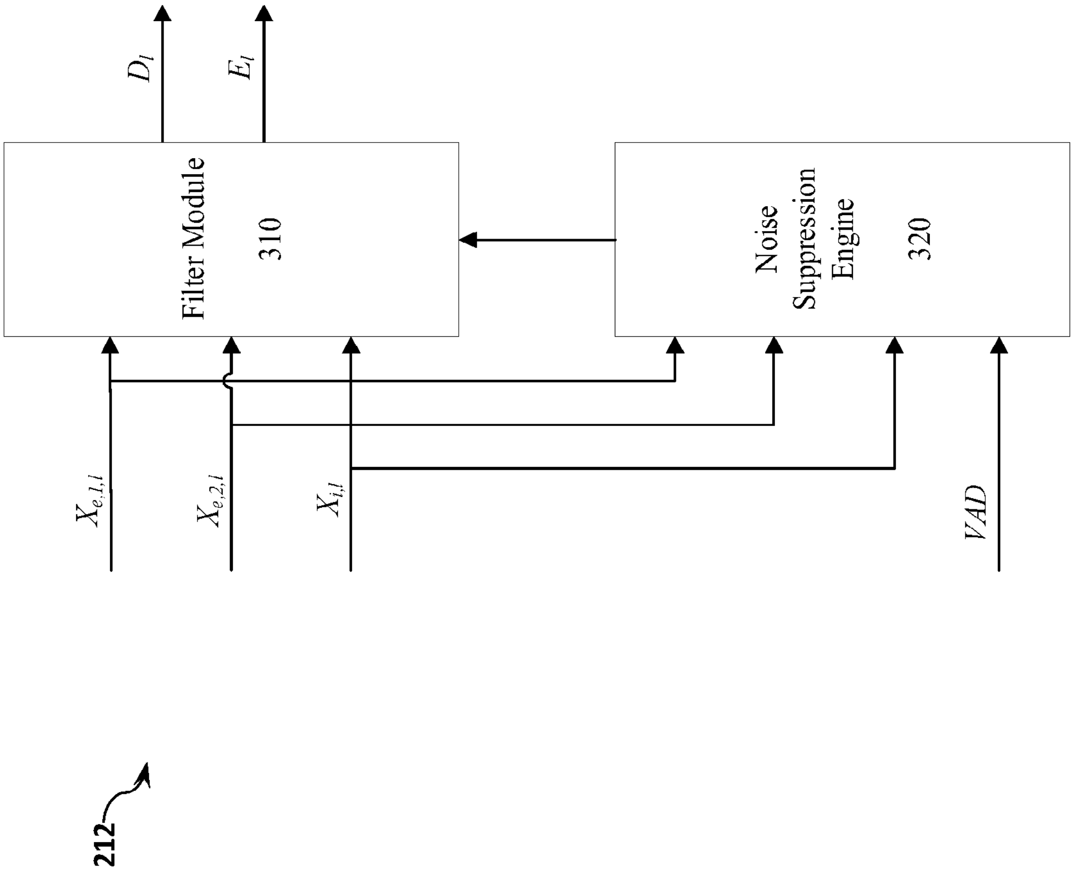
FIG. 3 illustrates an example low frequency spatial filter, in accordance with one or more embodiments of the present disclosure.

Referring to FIG. 3, an example embodiment of a low frequency spatial filter 212 will now be described in accordance with one or more embodiments. The low frequency spatial filter 212 includes a filter module 310 and a noise suppression engine 320. The filter module 310 applies spatial filtering gains on the input signals and obtains the voice and error estimates, $$D_l(f,t)=h_S^H(f,t)X_l(f,t),$$

$$\varepsilon_l(f,t)=X_{i,l}(f,t)-D_l(f,t),$$

where $h_S(f, t)$ is the spatial filter gain vector, $X_l(f, t)=[X_{e,1,l}(f, t)\ X_{e,2,l}(f, t)\ X_{i,l}(f, t)]^T$, and superscript H represents a Hermitian transpose. Since the transfer functions among $X_{e,1,l}(f, t)$, $X_{e,2,l}(f, t)$, and $X_{i,l}(f, t)$ vary during user speech, the filter gains are adaptively computed by the noise suppression engine 320.

The noise suppression engine 320 derives h s (f, t). There are several spatial filtering algorithms that can be adopted for use in the noise suppression engine 320, such as Independent Component Analysis (ICA), multichannel Weiner filter (MWF), spatial maximum SNR filter (SMF), and their derivatives. An example ICA algorithm is discussed in U.S. Patent Publication No. US20150117649A1, titled "Selective Audio Source Enhancement," which is incorporated by reference herein in its entirety.

Without losing generality, the MWF, for example, finds the spatial filtering vector $h_S(f, t)$ that minimizes $$E(\varepsilon_l(f,t))^2=E(X_{i,l}(f,t)-D_l(f,t))^2=E(X_{i,l}(f,t)-h_S^H(f,t)X_l(f,t))^2,$$

where E( ) represents expectation computation. The above minimization problem has been widely studied and one solution is $$h_S(f,t)=[I-\Phi_{xx}^{-1}(f,t)\Phi_{vv}(f,t)]X_l(f,t),$$

where I is the identity matrix, $\Phi_{xx}(f, t)$ is the covariance matrix of $X_l(f, t)$, and $\Phi_{vv}(f, t)$ is the covariance matrix of noise. The covariance matrix $\Phi_{xx}(f, t)$ is estimated via $$\Phi_{xx}(f,t)=\alpha\Phi_{xx}(f,t)+(1-\alpha)E(X_l(f,t)X_l^H(f,t))),$$

where α is a smoothing factor. The noise covariance matrix $\Phi_{vv}(f, t)$ can be estimated in a similar manner when there is only noise. The presence of voice can be identified by the voice activity detection (VAD) flag which is generated by VAD module 220, which is discussed in further detail below.

The SMF is another spatial filter which maximizes the SNR of speech estimate $D_l(f, t)$. It is equivalent to solving the generalized eigenvalue problem $$\Phi_{xx}(f,t)h_S(f,t)=\lambda_{max}\Phi_{vv}(f,t)h_S(f,t),$$

where $\lambda_{max}$ is the maximum eigenvalue of $\Phi_{vv}^{-1}(f, t)\Phi_{xx}(f, t)$.

Like the low frequency spatial filter 212, the high frequency spatial filter 232 has the same general structure when its spatial filtering algorithm is adaptive, such as ICA, MWF, and SMF. When the spatial filter is fixed, such as when a delay and sum or Superdirective beamformer is used, the high frequency spatial filter 232 can be reduced to the filter module, where the values of $h_S(f, t)$ are fixed and predetermined.

For systems using the delay and sum beamformer, for example, the spatial filter gains are $h_S(f, t)=h_S(f)=1/2d(f)=1/2[1\ e^{-j2\pi f\varphi_{12}}]^T$, where $\varphi_{12}$ is the time delay between the two external microphones.

For the Superdirective beamformer, for example, $$h_S(f,t)=h_S(f)=\frac{\Gamma^{-1}(f)d(f)}{d^H(f)\Gamma^{-1}(f)d(f)}$$

where Γ(f) is 2×2 pseudo-coherence matrix corresponding to the spherically isotropic noise $$\Gamma(f)=\begin{bmatrix}1 & \mathrm{sinc}(2\pi f\varphi_{12})\\ \mathrm{sinc}(-2\pi f\varphi_{12}) & 1\end{bmatrix}.$$

In various embodiments, the fixed spatial gains are dependent on the voice time delay between the two external microphones which can be measured during the headphone design.

Figure 4:
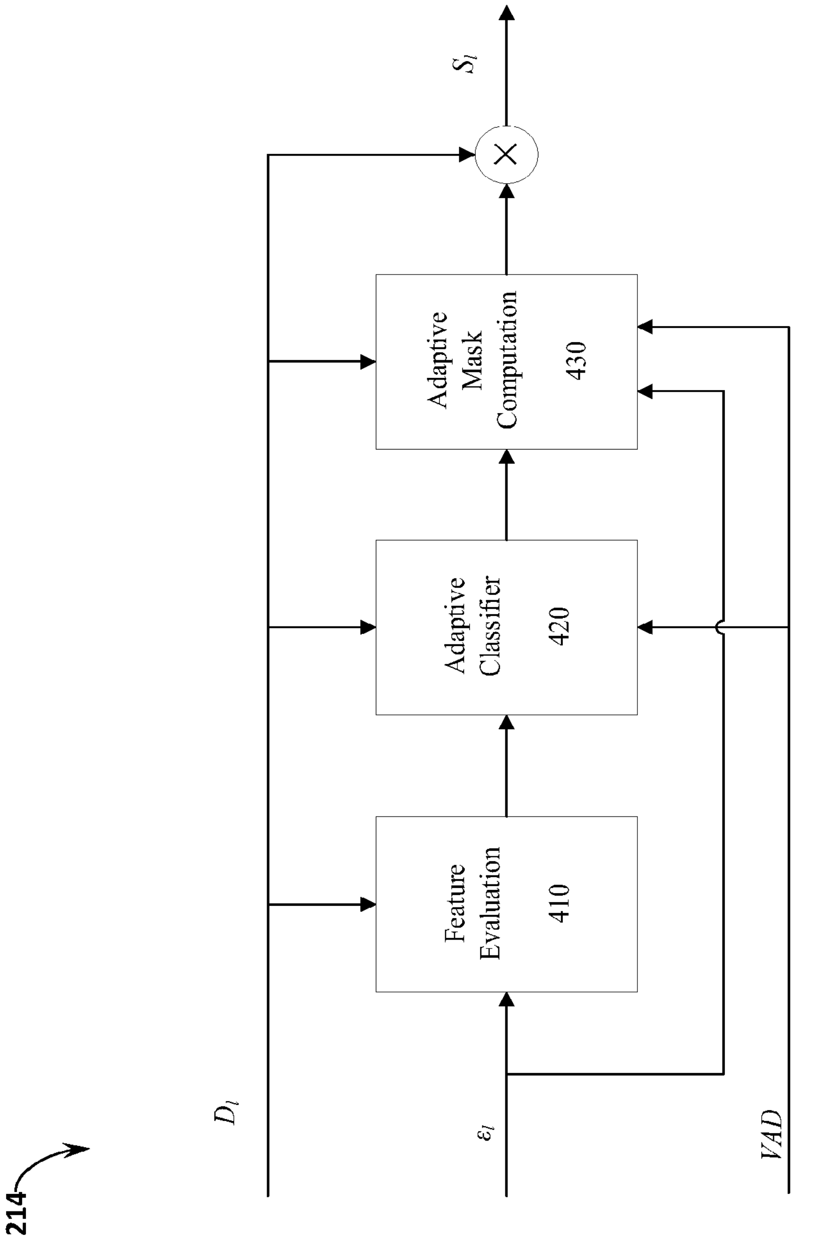
FIG. 4 illustrates an example low frequency spectral filter, in accordance with one or more embodiments of the present disclosure.

Referring to FIG. 4, an example embodiment of the low frequency spectral filter 214 will now be described in further detail. In some embodiments, the high frequency spectral filter 234 has the same structure and is omitted here for simplicity. The low frequency spectral filter 214 includes of a feature evaluation module 410, an adaptive classifier 420, and an adaptive mask computation module 430.

The adaptive mask computation module 430 is configured to generate the time and frequency varying masking gains to reduce the residue noise within $D_l(f, t)$. In order to derive the masking gains, specific inputs are used for the mask computation. These inputs include the speech and error estimate outputs from the spatial filter $D_l$ (f, t) and $\varepsilon_l$(f, t), the VAD 220 output, and adaptive classification results which are obtained from the adaptive classifier module 420. As such, the signals $D_l$(f, t) and $\varepsilon_l$(f, t) are forwarded to the feature evaluation module 410, which transfers the signals into features that represents the SNR of $D_l$(f, t). Feature selections in one embodiment include:

$$L_{l,1}(f,t)=\frac{|D_l(f,t)|}{|D_l(f,t)|+|\varepsilon_l(f,t)|}$$

$$L_{l,2}(f,t)=c(|D_l(f,t)|-|\varepsilon_l(f,t)|)$$

$$L_{l,3}(f,t)=c|D_l(f,t)|$$

where c is a constant to limit the feature values in the range 0 to 1. The feature evaluation module 410 can compute and forward one or multiple features to the adaptive classifier module 420.

The adaptive classifier is configured to perform online training and classification of the features. In various embodiments, it can apply either hard decision classification or soft decision classification algorithms. For the hard decision algorithms, e.g. K-means, Decision Tree, Logistic Regression, and Neural networks, the adaptive classifier recognizes $D_l$(f, t) as either speech or noise. For the soft decision algorithms, the adaptive classifier calculates the probability that $D_l$(f, t) belongs to speech. Typical soft decision classifiers that may be used include a Gaussian Mixture Model, Hidden Markov Model, and importance sampling-based Bayesian algorithms, e.g. Markov Chain Monte Carlo.

The adaptive mask computation module 430 is configured to adapt the gain to minimize residue noise in $D_l$(f, t) based on $D_l$(f, t), $\varepsilon_l$(f, t), VAD output (from VAD 220) and real time classification result from the adaptive classifier 420. More details regarding the implementation of the adaptive mask computation module can be found in U.S. Patent Publication No. US20150117649A1, titled "Selective Audio Source Enhancement," which is incorporated herein by reference in its entirety.

Referring back to FIG. 2, in the lowpass branch 202, the enhanced speech after the spectral filter $S_l$(f, t) is compensated by an equalizer 216 to remove the bone conduction distortion. The equalizer 216 can be fixed or adaptive. In the adaptive configuration, the equalizer 216 tracks the transfer function between $S_l$(f, t) and the external microphones when voice is detected by VAD 220 and applies the transfer function to $S_l$(f, t). The equalizer 216 can perform compensation in the whole low frequency band or only part of it. The high frequency processing branch 204 does not use internal microphone signal $X_l$(f, t) so its spectral filter output $S_h$(f, t) does not have bone conduction distortion.

Figure 5:
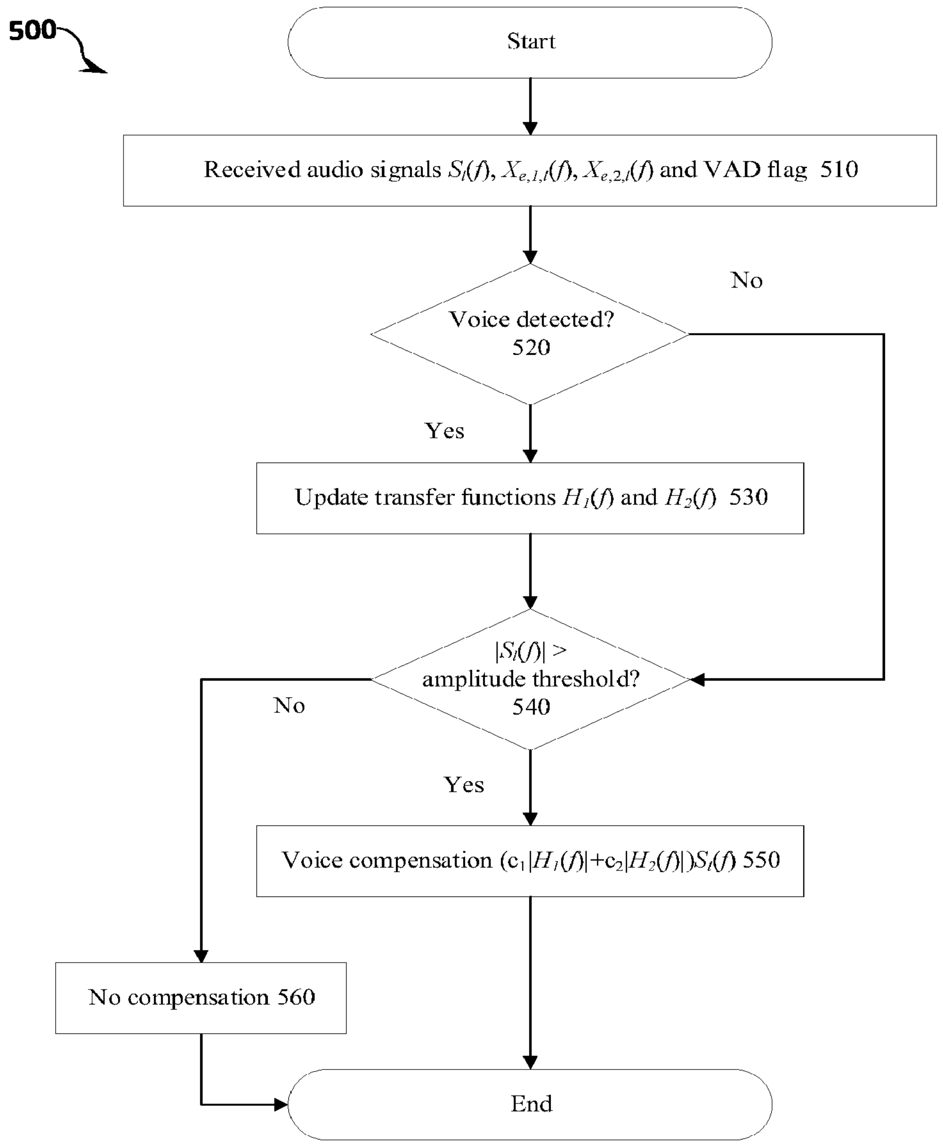
FIG. 5 is a flow diagram of an example operation of a mixture module and spectral filter module, in accordance with one or more embodiments of the present disclosure.

FIG. 5 is the flowchart illustrating an example process 500 for operating the adaptive equalizer 216. In step 510, the equalizer receives the signals $S_l$(f, t), $X_{e,1,l}$(f, t), and $X_{e,2,l}$(f, t), and in step 512 it checks the VAD flag. If the VAD detects voice, the equalizer will update the transfer functions $$H_1(f,t)=\frac{X_{e,1,l}(f,t)}{s_l(f,t)}$$

and $$H_2(f,t)=\frac{X_{e,2,l}(f,t)}{s_l(f,t)}$$

in step 530. There are many well-known ways to track $H_1$(f, t) and $H_2$(f, t). One way is $$H_1(f,t)=\frac{\overline{X}_{e,1,l}(f,t)}{\overline{S}_l(f,t)}\text{ and }H_2(f,t)=\frac{\overline{X}_{e,2,l}(f,t)}{\overline{S}_l(f,t)},$$

where $\overline{X}_{e,1,l}$(f, t), $\overline{X}_{e,2,l}$(f, t) and $\overline{S}_l$(f, t) are the average of $X_{e,1,l}$(f, t), $X_{e,2,l}$(f t), and $S_l$(f, t) over time. Other methods include Wiener filter, Subspace method, and least mean square filter. Here we use $H_1$(f, t) estimation as an example. In the Wiener filter method, $H_1$(f, t) is tracked by $$H_1(f,t)=\frac{\overline{\sigma}_{S,1}^2(f,t)}{\overline{\sigma}_S^2(f,t)}$$

where $\overline{\sigma}_{S,1}^2(f,t)=\alpha\overline{\sigma}_{S,1}^2(f,t-1)+(1-\alpha)(S_l^*(f,t)X_{e,1,l}(f,t))$ and $\overline{\sigma}_S^2=\alpha\overline{\sigma}_S^2(f,t-1)+(1-\alpha)(S_l^*(f,t)S_l(f,t))$.

The subspace method, for example, estimates the covariance matrix $$\Phi_{S,1}(f,t)=\begin{bmatrix}\overline{\sigma}_S^2(f,t) & \overline{\sigma}_{S,1}^2(f,t)\\ \overline{\sigma}_{S,1}^2(f,t) & \overline{\sigma}_1^2(f,t)\end{bmatrix},$$

where $\overline{\sigma}_1^2(f,t)=\alpha\overline{\sigma}_1^2(f,t-1)+(1-\alpha)(X_{e,1,l}^*(f,t)X_{e,1,l}(f,t))$, and finds the eigenvector $\beta=[\beta_1\ \beta_2]^T$ corresponds to the maximum eigenvalue of $\Phi_{S,1}$(f, t). Then, $$H_1(f,t)=\frac{\beta_2}{\beta_1}.$$

In the least mean square filter $H_1$(f, t) is tracked by $$H_1(f,t)=H_1(f,t-1)+(1-\alpha)\left(\frac{S_l^*(f,t)X_{e,1,l}(f,t)}{S_l^*(f,t)S_l(f,t)}-H_1(f,t-1)\right)$$

After the estimation of $H_1$(f, t) and $H_2$(f, t), the adaptive equalizer compares the amplitude of spectral output $|S_l(f,t)|$ with a threshold which is to determine the bone conduction distortion level in step 540. In various embodiments, the threshold can be a fixed predetermined value or a variable which is dependent on the external microphone signal strength.

If the spectral output is beyond the amplitude threshold, the adaptive equalizer performs distortion compensation (step 550) that $$\hat{S}_l(f,t)=(c_1H_1(f,t)+c_2H_2(f,t))S_l(f,t)$$

where $c_1$ and $c_2$ are constants. For example, $c_1=1$ and $c_2=0$ makes the compensation with respect to the external microphone 1. If the spectral output is below the threshold, no compensation is necessary (step 560) and $\hat{S}_l(f,t)=S_l(f,t)$. Note that the above adaptive equalizer performs both amplitude and phase compensation. In various embodiments, only amplitude compensation is performed.

Referring back to FIG. 2, the last stage is a crossover module 236 that mixes the low frequency band and high frequency band outputs. The VAD information is widely used in the system, and any suitable voice activity detector can be used with the present disclosure. For example, the estimated voice DOA and a priori knowledge of the mouth location can be used to determine if the user is speaking. Another example is the inter-channel level difference (ILD) between the internal microphone and the external microphones. The ILD will overpass the voice detected threshold in the low frequency band when the user is speaking.

Embodiments of the present disclosure can be implemented in various devices with two or more external microphones and at least one internal microphone inside of the device housing, such as headphone, smart glasses, and VR device. Embodiments of the present disclosure can apply the fixed and adaptive spatial filters in the spatial filtering stage, the fixed spatial filter can be delay and sum and Superdirective beamformers, and the adaptive spatial filters can be Independent Component Analysis (ICA), multichannel Weiner filter (MWF), spatial maximum SNR filter (SMF), and their derivatives.

In various embodiments, various adaptive classifiers in the spectral filtering stage can be used, such as K-means, Decision Tree, Logistic Regression, Neural Networks, Hidden Markov Model, Gaussian Mixture Model, Bayesian Statistics, and their derivatives.

In various embodiments, various algorithms can be used in the spectral filtering stage, such as Wiener filter, subspace method, maximum a posterior spectral estimator, maximum likelihood amplitude estimator.

Figure 6:
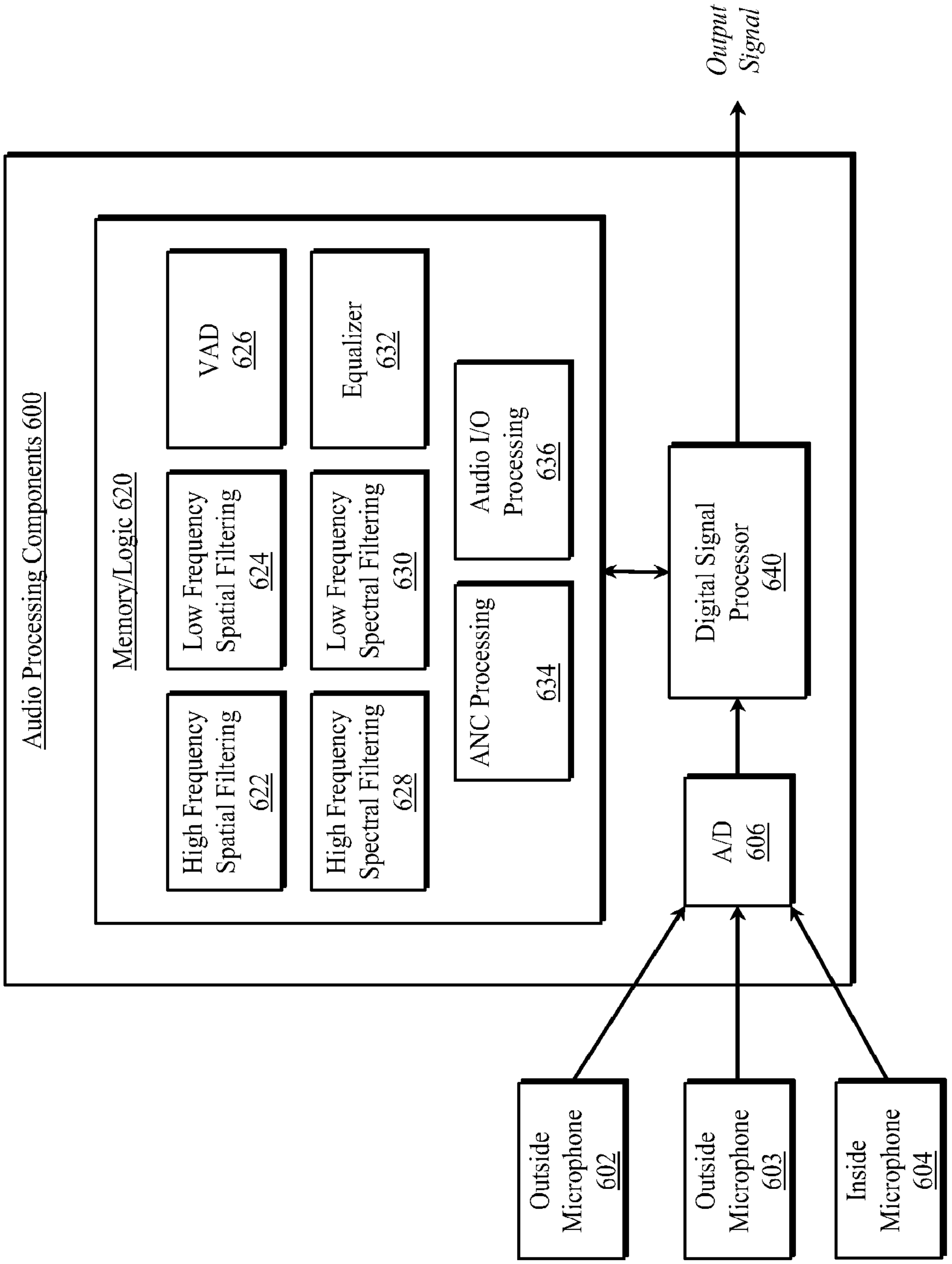
FIG. 6 illustrates example audio input processing components, in accordance with one or more embodiments of the present disclosure.

FIG. 6 is a diagram of audio processing components 600 for processing audio input data in accordance with an example embodiment. Audio processing components 600 generally correspond to the systems and methods disclosed in FIGS. 1-5, and may share any of the functionality previously described herein. Audio processing components 600 can be implemented in hardware or as a combination of hardware and software and can be configured for operation on a digital signal processor, a general-purpose computer, or other suitable platform.

As shown in FIG. 6, audio processing components 600 include memory 620 that may be configured to store program logic and a digital signal processor 640. In addition, audio processing components 600 include high frequency spatial filtering module 622, a low frequency spatial filtering module 624, a voice activity detector 626, a high frequency spectral filtering module 628, a low frequency spectral filtering module 630, an equalizer 632, ANC processing components 634 and audio input/output processing module 636, some or all of which may be stored as executable program instructions in the memory 620.

Also shown in FIG. 6 are headset microphones including outside microphones 602 and 603, and an inside microphone 604, which are communicative coupled to the audio processing components 600 in a physical (e.g., hardwire) or wireless (e.g., Bluetooth) manner. Analog to digital converter components 606 are configured to receive analog audio inputs and generate corresponding digital audio signals to the digital signal processor 640 for processing as described herein.

In some embodiments, digital signal processor 640 may execute machine readable instructions (e.g., software, firmware, or other instructions) stored in memory 620. In this regard, processor 640 may perform any of the various operations, processes, and techniques described herein. In other embodiments, processor 640 may be replaced and/or supplemented with dedicated hardware components to perform any desired combination of the various techniques described herein. Memory 620 may be implemented as a machine-readable medium storing various machine-readable instructions and data. For example, in some embodiments, memory 620 may store an operating system, and one or more applications as machine readable instructions that may be read and executed by processor 640 to perform the various techniques described herein. In some embodiments, memory 620 may be implemented as non-volatile memory (e.g., flash memory, hard drive, solid state drive, or other non-transitory machine-readable mediums), volatile memory, or combinations thereof.

In various embodiments, the audio processing components 600 are implemented within a headset or a user device such as a smartphone, tablet, mobile computer, appliance or other device that processes audio data through a headset. In operation, the audio processing components 600 produce an output signal that may be stored in memory, used by other device applications or components, or transmitted to for use by another device.

It should be apparent that the foregoing disclosure has many advantages over the prior art. The solutions disclosed herein are less expensive to implement than conventional solutions, and do not require precise prior training/calibration, nor the availability of a specific activity-detection sensor. Provided there is room for a second inside microphone, it also has the advantage of being compatible with, and easy to integrate into, existing headsets. Convention solutions require pre-training, are computationally complex, and the results shown are not acceptable for many human listening environments.

In one embodiment, a method for enhancing a headset user's own voice includes receiving a plurality of external microphone signals from a plurality of external microphones configured to sense external sounds through air conduction, receiving an internal microphone signal from an internal microphone configured to sense a bone conduction sound from the user during speech, processing the external microphone signals and internal microphone signals through a lowpass process comprising a low frequency spatial filtering and low frequency spectral filtering of each signal, processing the external microphone signal through a highpass process comprising high frequency spatial filtering and high frequency spectral filtering of each signal, and mixing the lowpass processed signals and highpass processed signals to generate an enhanced voice signal.

In various embodiments, the lowpass process further comprises lowpass filtering of the external microphone signals and internal microphone signal, and/or the highpass process further comprises highpass filtering of the external microphone signals. The low frequency spatial filtering may comprise generating low frequency speech and error estimates, and the low frequency spectral filtering may comprise generating an enhanced speech signal. The method may further include applying an equalization filter to the enhanced speech signal to mitigate distortion from the bone conduction sound, detecting voice activity in the external microphone signals and/or internal microphone signals, and/or receiving a speech signal, error signals, and a voice activity detection data and updating transfer functions if voice activity is detected.

In some embodiments of the method the low frequency spatial filtering comprises applying spatial filtering gains on the signals and generating voice and error estimates, wherein the spatial filtering gains are adaptively computed based at least in part on a noise suppression process. The low frequency spectral filtering may comprise evaluating features from the voice and error estimates, adaptively classifying the features and computing an adaptive mask. The method may further comprise comparing an amplitude of the spectral output to a threshold to determine a bone conduction distortion level and applying voice compensation based on the comparing.

In some embodiments, a system comprises a plurality of external microphones configured to sense external sounds through air conduction and generate corresponding external microphone signals, an internal microphone configured to sense a user's bone conduction during speech and generate a corresponding internal microphone signal, a lowpass processing branch configured to receive the external microphone signals and internal microphone signals and generate a lowpass output signal, a highpass processing branch configured to receive the external microphone signals and generate a highpass output signal, and a crossover module configured to mix the lowpass output signal and highpass output signal to generate an enhanced voice signal. Other features and modifications as disclosed herein may also be included.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A method comprising:

receiving a plurality of external microphone signals from a plurality of external microphones configured to sense external sounds through air conduction;

receiving an internal microphone signal from an internal microphone configured to sense a bone conduction sound from a user during speech;

processing the external microphone signals and the internal microphone signal through a lowpass process comprising filtering by a low frequency spatial filter, filtering by a low frequency spectral filter, and generating one or more lowpass processed signals based at least in part on an output of the low frequency spectral filter;

processing the external microphone signals, and not the internal microphone signal, through a highpass process to generate one or more highpass processed signals, the highpass process comprising:

obtaining high frequency voice and error estimates based at least in part on filtering a second set of signals corresponding to the external microphone signals by a high frequency spatial filter; and obtaining a second output of a high frequency spectral filter based at least in part on filtering the high frequency voice and error estimates by the high frequency spectral filter; and mixing at least one of the one or more lowpass processed signals and at least one of the one or more highpass processed signals to generate an enhanced voice signal.

2. The method as recited in claim 1, wherein the highpass process further comprises highpass filtering of the external microphone signals with highpass filter banks.

3. The method as recited in claim 2, wherein the highpass filtering generates the second set of signals.

4. The method as recited in claim 1, wherein the highpass process further comprises obtaining high frequency voice and error estimates based at least in part on the filtering of the second set of signals by the high frequency spatial filter.

5. The method as recited in claim 1, wherein the highpass process further comprises obtaining a second output of the high frequency spectral filter based at least in part on filtering high frequency voice and error estimates by the high frequency spectral filter.

6. The method as recited in claim 1, wherein the one or more highpass processed signals correspond to output of the high frequency spectral filter and do not have bone conduction distortion.

7. The method as recited in claim 1, further comprising applying an equalization filter to an enhanced speech signal to mitigate distortion from the bone conduction sound.

8. The method as recited in claim 1, further comprising detecting voice activity in the external microphone signals and/or the internal microphone signal.

9. The method as recited in claim 1, further comprising:

receiving a speech signal, error signals, and a voice activity detection data; and updating transfer functions if voice activity is detected.

10. The method as recited in claim 9, further comprising:

comparing an amplitude of a spectral output to a threshold to determine a bone conduction distortion level, and applying voice compensation based on the comparing.

11. A system comprising:

a plurality of external microphones configured to sense external sounds through air conduction and generate external microphone signals corresponding to the sensed external sounds;

an internal microphone configured to sense a bone conduction sound from a user during speech and generate an internal microphone signal corresponding to the sensed bone conduction sound;

a lowpass processing branch configured to process the external microphone signals and the internal microphone signal through a lowpass process comprising filtering by a low frequency spatial filter, filtering by a low frequency spectral filter, and generating one or more lowpass processed signals based at least in part on an output of the low frequency spectral filter;

a highpass processing branch configured to process the external microphone signals, and not the internal microphone signal through a highpass process to generate one or more highpass processed signals, the highpass process comprising:

obtaining high frequency voice and error estimates based at least in part on filtering a second set of signals corresponding to the external microphone signals by a high frequency spatial filter; and obtaining a second output of a high frequency spectral filter based at least in part on filtering the high frequency voice and error estimates by the high frequency spectral filter; and a crossover module configured to mix at least one of the one or more lowpass processed signals and at least one of the one or more highpass processed signals to generate an enhanced voice signal.

12. The system as recited in claim 11, wherein the highpass process further comprises highpass filtering of the external microphone signals with highpass filter banks.

13. The system as recited in claim 12, wherein the highpass filtering generates the second set of signals.

14. The system as recited in claim 11, wherein the highpass process further comprises obtaining high frequency voice and error estimates based at least in part on the filtering of the second set of signals by the high frequency spatial filter.

15. The system as recited in claim 11, wherein the highpass process further comprises obtaining a second output of the high frequency spectral filter based at least in part on filtering high frequency voice and error estimates by the high frequency spectral filter.

16. The system as recited in claim 11, wherein the one or more highpass processed signals correspond to output of the high frequency spectral filter and do not have bone conduction distortion.

17. The system as recited in claim 11, further comprising an equalization filter configured to mitigate distortion from bone conduction in an enhanced speech signal.

18. The system as recited in claim 11, further comprising a voice activity detector configured to detect voice activity in the external microphone signals and/or the internal microphone signal.

19. The system as recited in claim 11, further comprising an equalizer configured to:

receive a speech signal, error signals, and voice activity detection data; and update transfer functions if voice activity is detected.

20. The system as recited in claim 19, wherein the equalizer is further configured to:

compare an amplitude of a speech signal spectral output to a threshold to determine a bone conduction distortion level, and apply voice compensation based on the comparison.

* * * * *